US010959245B2

(12) United States Patent
Doostnejad et al.

(10) Patent No.: US 10,959,245 B2
(45) Date of Patent: Mar. 23, 2021

(54) METHODS, SYSTEMS, AND APPARATUS TO COORDINATE MULTIPLE ACCESS POINT SCHEDULING AND TRANSMISSION

(71) Applicant: Intel IP Corporation, Santa Clara, CA (US)

(72) Inventors: Roya Doostnejad, Los Altos, CA (US); Thomas Kenney, Portland, OR (US); Laurent Cariou, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 231 days.

(21) Appl. No.: 16/134,589

(22) Filed: Sep. 18, 2018

(65) Prior Publication Data

US 2019/0045522 A1 Feb. 7, 2019

(51) Int. Cl.
*H04W 72/12* (2009.01)
*H04W 84/12* (2009.01)

(52) U.S. Cl.
CPC ...... *H04W 72/1231* (2013.01); *H04W 72/121* (2013.01); *H04W 84/12* (2013.01)

(58) Field of Classification Search
CPC combination set(s) only.
See application file for complete search history.

(56) References Cited

U.S. PATENT DOCUMENTS

| 2008/0119182 A1* | 5/2008 | Kwun | H04W 36/00837 |
| | | | 455/424 |
| 2008/0157957 A1* | 7/2008 | Pitchers | H05B 47/10 |
| | | | 340/539.1 |
| 2013/0229996 A1* | 9/2013 | Wang | H04L 1/1685 |
| | | | 370/329 |
| 2013/0230028 A1* | 9/2013 | Calcev | H04L 1/0041 |
| | | | 370/336 |
| 2013/0322277 A1* | 12/2013 | Vanganuru | H04L 1/20 |
| | | | 370/252 |
| 2014/0256347 A1* | 9/2014 | Lakhzouri | G01S 5/0205 |
| | | | 455/456.1 |
| 2015/0045054 A1* | 2/2015 | Emadzadeh | G01S 5/0242 |
| | | | 455/456.1 |
| 2015/0080020 A1* | 3/2015 | Edge | H04W 24/10 |
| | | | 455/456.1 |

(Continued)

*Primary Examiner* — Yee F Lam
(74) *Attorney, Agent, or Firm* — Hanley, Flight & Zimmerman, LLC

(57) ABSTRACT

Methods and apparatus to coordinate multiple access point scheduling and transmission disclosed. An example apparatus includes transmit first instructions to a first station and a second station to perform a signal measurement protocol; responsive to obtaining a first primary association from the first station and a secondary association or a second primary association from the second station, transmit second instructions to the first station to provide first directional information and the second station to provide second directional information; a processor to, when the first directional information corresponds to a first value within a threshold range of a second value corresponding to the second directional information, group the first station and the second station; and the interface to transmit information corresponding to the group to a server to schedule communications between a first and second access point and the first station and the second station.

20 Claims, 14 Drawing Sheets

(56) References Cited

U.S. PATENT DOCUMENTS

| | | | |
|---|---|---|---|
| 2015/0212191 A1* | 7/2015 | Zhang | G01S 5/0236 |
| | | | 342/450 |
| 2016/0192151 A1* | 6/2016 | Marri Sridhar | H04W 4/06 |
| | | | 455/418 |
| 2016/0373970 A1* | 12/2016 | Kulal | H04W 36/0061 |
| 2017/0104568 A1* | 4/2017 | Nasiri Khormuji | |
| | | | H04J 11/0043 |
| 2017/0195140 A1* | 7/2017 | Yi | H04L 5/0073 |
| 2018/0049077 A1* | 2/2018 | Mestanov | H04W 36/0083 |
| 2018/0070346 A1* | 3/2018 | Soldati | H04L 1/0061 |
| 2018/0076937 A1* | 3/2018 | Nasiri Khormuji | |
| | | | H04W 72/0453 |
| 2018/0313944 A1* | 11/2018 | Park | G01S 11/06 |
| 2019/0182866 A1* | 6/2019 | Li | H04W 72/121 |
| 2020/0021952 A1* | 1/2020 | Koudouridis | H04W 48/16 |

\* cited by examiner

METHODS, SYSTEMS, AND APPARATUS TO COORDINATE MULTIPLE ACCESS POINT SCHEDULING AND TRANSMISSION

FIELD OF THE DISCLOSURE

This disclosure relates generally to wireless fidelity connectivity (Wi-Fi) and, more particularly, to methods and apparatus to coordinate multiple access point scheduling and transmission.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
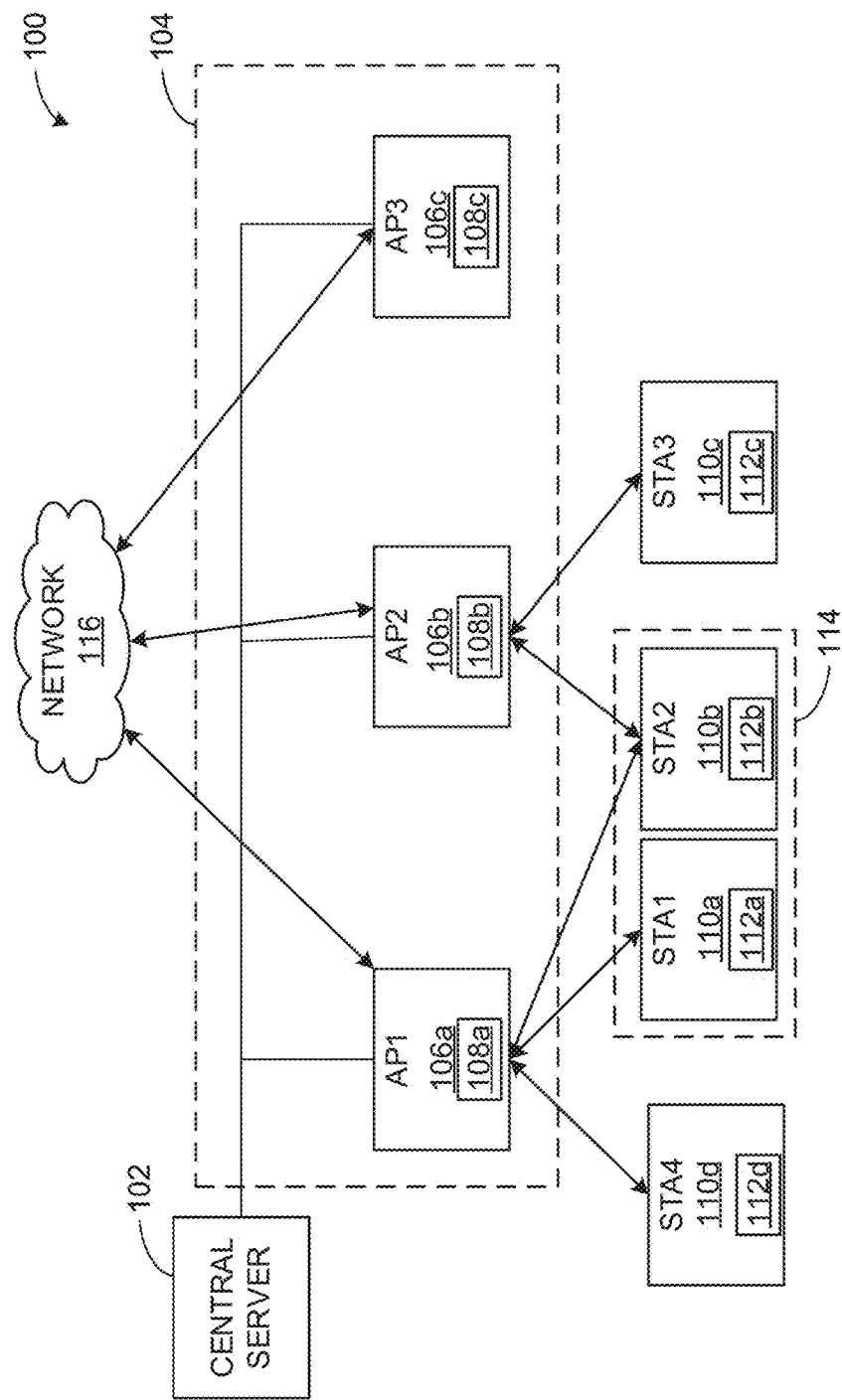
FIG. 1 is an example wireless communication environment to schedule communication between Wi-Fi devices.

Various locations (e.g., homes, offices, coffee shops, restaurants, parks, airports, etc.) may provide Wi-Fi to Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled device within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol by which the AP communicates with the STAs to provide access to the Internet by having the STAs transmit uplink (UL) transmissions and receive downlink (DL) transmissions to/from the Internet. Some APs communicate using beamforming techniques. Beamforming wireless network systems wirelessly transmit data from a source station (e.g. a router, etc.) to a destination station (e.g., a computing device, a mobile device, etc.) using a concentrated electromagnetic signal that travels in substantially one direction.

Examples disclosed herein relate to high density Wi-Fi networks, in which there may be several STAs requesting a network connection. Accordingly, multiple APs may be deployed in different frequency channels and/or in the same frequency channel (e.g., collaborative beamforming). Collaborative beamforming enables simultaneous transmission from multiple APs in a network of APs in the same frequency channel without joint processing. Such schemes primarily rely in the directionality of the AP's beams (e.g., scheduling concurrent transmissions which are spatially separated). However, when stations are located close to each other, collaborative beamforming may cause a large amount of interference and decrease packet throughput. Examples disclosed herein perform a grouping protocol to group STAs that are located near each other. In this manner, examples disclosed herein can schedule a network of STAs using collaborative beamforming while scheduling grouped STAs in the network of STAs using different frequency channels and/or time to avoid interference.

Examples disclosed herein include a network of APs that transmit instructions to each STA in the network to perform a signal strength protocol to identify a primary AP (e.g., corresponding to the strongest signal strength) and/or secondary AP(s) (e.g., corresponding to signal strengths that satisfy a threshold). The STAs transmit the primary and/or secondary AP-STA association(s) once the primary AP and the secondary AP(s) have been identified. For example, when a STA identifies an AP as a primary AP, the STA transmits a primary STA-AP association identifying that the connection between the STA and the AP is primary. When a STA identifies an AP as a secondary AP, the STA transmits a secondary STA-AP association identifying that the connection between the STA and the AP is secondary. Once the AP receives the STA-AP associations, the AP pulls beamforming (BF) reports from the STAs that transmitted primary and/or secondary STA-AP associations (e.g., the primary and secondary STAs). In some examples, a primary STA-AP association corresponds to a first STA connected to a first AP to access a network. In a secondary STA-AP association, the first STA may not be connected to the first AP but may be located near a second STA that is connected to the first AP. Accordingly, the secondary STA-AP connection can help identify STAs that are located near each other that are connected to different APs to reduce interference. The BF reports identify a direction of the primary/secondary APs with respect to the AP. In this manner, the AP can group any STAs that are located in the same/similar direction (e.g., within a threshold range of angles with respect to the AP). Examples disclosed herein schedule communications based on the groups to avoid interference cause by communication to STAs that are located near each other within the same time and/or frequency. Accordingly, Examples disclosed herein provide a low complexity and lower overhead coordination scheme to enable multiuser/multi AP scheduling where channel sounding and BF feedback reports are not required from all STAs in the network. Such examples disclosed herein provide a low complexity, proximity-based grouping (e.g., based on the signal strengths between STAs) technique to select AP-STA pairs for simultaneous transmission. In this manner, such examples disclosed herein will not schedule STA in the same group for simultaneous transmission.

Additionally, during channel estimation protocols, residual, undesired multiuser interference may be seen at each STA's receiver. Examples disclosed herein provide a receiver (e.g., an interference rejection combining (IRC) or minimum mean square error (MMSE) receiver) to mitigate the residual multiuser interference by computing a noise and interference covariance matrix that may be used by the receiver to mitigate the interference during channel estimation.

FIG. 1 is an example wireless communication environment 100 to schedule communication between Wi-Fi devices. The example wireless communication environment 100 of a collaborative beamform set that includes an example central server 102 and an example AP network 104 including example APs 106a-c having example AP protocol executer 108a-c. The environment 100 of FIG. 1 also includes example STAs 110a-d, example STA feedback generators 112a-d, an example STA grouping 114, and an example network 116. Although the illustrated example of FIG. 1 includes three APs 106a-c and four STAs 110a-d and one network 116, the example environment 100 may include any number of APs, STAs, and/or networks.

The example central server 102 of FIG. 1 is a device that communicates (e.g., via a wired or wireless communication) with the example APs 106a-c in the example AP network 104 to facilitate the scheduling of the example STAs 110a-d. In some examples, the server 102 may be a processor running on one of the example APs 106a-c or another AP. In such examples, the AP that implements the example central server 102 may be the master AP. In some examples, the server 102 initiates a grouping protocol to determine which STAs are located within a threshold distance of other STAs (e.g., corresponding to the example grouping 114). The server 102 initiates the grouping protocol to ensure that APs 106a-c can schedule connected STAs 110a-d (e.g., that are not grouped with other STAs) at the same time/frequency, so long as doing so will not cause interference on any one of the wireless devices. Additionally, the example central server 102 initiates the grouping protocol to ensure that the example APs 106a-c do not schedule grouped STAs at the same time and/or frequency (e.g., because doing so would cause significant interference).

The example APs 106a-c of FIG. 1 are devices that allow the example STAs 110a-d to wirelessly access the example network 116. The example APs 106a-c may be routers, a modem-routers, and/or any other devices that provides a wireless connection to the example network 116. A router provides a wireless communication link to a STA. The router accesses the network 116 through a wire connection via a modem. A modem-router combines the functionalities of the modem and the router. The example APs 106a-c may include one or more antennas or one or more types to perform one or more communication protocols (e.g., BF, single-user BF, multi-user BF, MIMO, etc.). The example APs 106a-c include radio architecture (e.g., the example radio architecture 1000 of FIG. 10) to be able to wirelessly transmit data. Additionally, the example APs 106a-c include the example AP protocol executer 108a-c to facilitate the obtaining of relevant information (e.g., channel sounding feedback reports, RSSI measurements, SNR measurements, BF feedback reports, etc.). For example, the example APs 106a-c may instruct the example STAs 110a-d to perform a channel sounding protocol so that the STAs 110a-d can determine the signal strengths between each individual STA 110a-d to each individual AP 110a-c. In such an example, the STAs 110a-d may determine which AP-STA associations are primary and which are secondary, as further described below. Once the APs 106a-c receives the primary and/or secondary associations from the STAs 110a-d, the example APs 106a-c pull BF reports from the primary and secondary STAs based on the AP-STA associations. For example, if the example AP 106a determines that the example STA1 110a, a primary STA, and the example STA2 110b, a secondary STA, are located in the same/similar direction (e.g., based on the BF feedback reports from the STAs 110a-b to the AP 106a), the AP 106a groups the STAs 110a-b into the example group 114 and transmits the grouping (e.g., association) to the example central server 102. The combination of the signal strength and direction corresponds to a location. Accordingly, if two STAs identify more than a threshold RSSI value for a particular AP and are within a threshold direction of the AP, the AP can determine that they are located near each other, even if the AP is not connected to one of the STAs. In this manner, the central server 102 can schedule the grouped STAs 110a-b at a different time/frequency to avoid interference, even though the STAs 110a-b are connected to different APs.

The example AP protocol executer 108a-c of FIG. 1 facilitate the obtaining of information for the scheduling of the example STAs 110a based on the instructions from the example central server 102. For example, if the example AP protocol executer 108a of the first example AP 106a receives instructions from the example central server 102 to perform a grouping protocol, the example AP protocol executer 108a may transmit a request of a report (e.g., a beacon report) from the connected STAs (e.g., the example STA 110a). The request may correspond to one or more channels that the STA 110a should listen to (e.g., sense). In this manner, the example STA 110a can report information (e.g., a signal to noise ratio (SNR), a received signal strength indicator (RSSI) value, etc.) based on the beacon. After transmitting the beacon, the AP protocol executer 108a receives primary and/or secondary STA-AP associations from the primary and/or secondary STAs. The example AP protocol executer 108a transmits BF report request from the primary and/or secondary APs (e.g., to pull BF reports). For example, if the STA1 110a determines that the AP1 106a is a primary AP and the STA2 110b determines that the AP1 106a is a secondary AP, the AP protocol executer 108a transmits BF report request to the example STAs 110a, 110b. After the AP protocol executer 108a receives the corresponding BF reports, the AP protocol executer 108a groups any primary and/or secondary STAs that correspond to the same/similar direction (e.g., within a predetermined threshold range). The example AP protocol executer 108a transmits the grouping to the example central server 108 to schedule the grouped STAs. An example of one of the example AP protocol executer 108a-c is further described below in conjunction with FIG. 2.

The example STAs 110a-d of FIG. 1 are Wi-Fi enabled computing devices. The example STAs 110a-d may be, for example, computing devices, portable devices, mobile devices, mobile telephones, smart phones, tablets, gaming systems, digital cameras, digital video recorders, televisions, set top boxes, e-book readers, and/or any other Wi-Fi enabled devices. The example STAs 110a-d include the example STA feedback generators 112a-d to connect and communicate with a Wi-Fi AP (e.g., the example APs 106a-c) and perform measurements that may be used for the grouping protocol.

The example STA feedback generators 112a-d of FIG. 1 receive instructions from one or more of the example APs 106a-c to perform a signal measurement request (e.g., RSSI request or SNR measurement request). Once received, the example STA feedback generators 112a-d process the request and perform the corresponding measurement. For example, the request may correspond to channels that the STA feedback generators 112a-d should listen to. The example STA feedback generator 112a-c measures the signal characteristics corresponding to signal strength (e.g., RSSI, SNR, etc.) of each of the APs 106a-c in the AP network 104. In this manner, the STA feedback generators 112a-d can determine which AP should be a primary AP based on the highest signal strength. Additionally, the example STA feedback generators 112a-d determine if any of the remaining APs 106a-c can be secondary APs. For example, the example STA feedback generators 112a-d may identify secondary APs as one or more APs whose signal strength is above a threshold. The threshold and/or number of APs that may be secondary may be based on user and/or manufacturer preferences. For example, some preferences may correspond to selecting no more than two APs whose signal strength is above the threshold (e.g., the APs with the two highest signal strengths). Once the STA feedback generators 112a-d determine the primary and secondary AP-STA associations, the STA feedback generators 112a-d transmit the primary STA-AP associations to the primary AP and the secondary STA-AP associations to the secondary AP(s). For example, the example STA feedback generator 112b of the STA2 110b may determine that the AP2 106b is a primary AP (e.g., because the measured RSSI corresponding the AP2 106b was highest) and that the AP1 106a is a secondary AP (e.g., because the measured RSSI corresponding to AP1 106a is above a threshold). In such an example, the STA feedback generator 112 transmits a signal to the AP2 106b corresponding to a primary AP-STA association and transmits a signal to the AP1 106a corresponding to a secondary AP-STA association. In this manner, the example APs 106a-b can pull BF reports from the primary and secondary STAs based on the associations. Additionally, when channel sounding occurs (e.g., when the example APs 106a-v pull BF reports from the primary and secondary STAs), the example STA feedback generators 112a-d perform channel sounding protocols and generate CSIs including BF feedback reports including directional information for the primary and/or secondary APs. In some examples, the channel sounding protocols differ for primary STAs and secondary STAs. For example, if AP 106a transmits a BF report request from the example STA1 110a (e.g., a primary STA) and the example STA2 110b (e.g., a secondary STA), the example STA1 110a performs a full BF report (e.g., rank-1 BF report), while the second STA2 110b performs a low rate BF report that includes directional information without the full data of a rank-1 BF report. For example, the STA2 110b may measure the channel and only send a quantized BF report based on the largest eigen vector. The example STA feedback generator 112b transmits the generated BF reports to the corresponding AP(s) for the grouping protocol.

The example network 116 of FIG. 1 is a system of interconnected systems exchanging data. The example network 116 may be implemented using any type of public or private network such as, but not limited to, the Internet, a telephone network, a local area network (LAN), a cable network, and/or a wireless network. To enable communication via the network 116, the example Wi-Fi APs 106a-c includes a communication interface that enables a connection to an Ethernet, a digital subscriber line (DSL), a telephone line, a coaxial cable, or any wireless connection, etc. In some examples, the server 102 and the example APs 106a-c are connected via the example network 116.

In the example environment 100 of FIG. 1, the example AP protocol executors 108a-c of the example APs 106a-c initiate the grouping protocol based on instructions from the central server 102. Accordingly, each of the example STA feedback generators 112a-d perform a signal strength measurement of each of the signals transmitted by each of the APs 106a-c in the AP network 104. For example, the STAs 110a-d generate a RSSI value for each of the APs 106a-c. In such an example, the STA1 110a and the STA4 110d both determine that the RSSI of the example AP 106a is highest and select the AP1 106a as a primary AP. Accordingly, each of the example STAs 110a, 110d transmit primary STA-AP associations to the example AP 106a. However, because the RSSI values corresponding to the other APs 106b, 106c are not above a threshold value, the STAs 110a, 110d do not transmit STA-AP associations to the example APs 106b, 106c. The example STA2 110b determines that the RSSI value corresponding to the AP2 106b is highest and that the RSSI value corresponding to AP1 106a is above the threshold. Accordingly, the example STA2 110b transmits a primary STA-AP association to the example AP2 106b and transmits a secondary STA-AP association to the example AP1 106a.

After the signal measurement protocol is complete, the example AP1 106a receives a primary STA-AP association from the example STAs 110a, 110d, a secondary STA-AP association from the example STAs 110b, and no STA-AP association from the example STA3, 110c. Accordingly, the example AP1 106a pulls BF reports from the example STAs 110a, 110b, 110d (e.g., associated with a primary or secondary STA-AP association) and does not pull a BF report from the example STA 110c, because a STA-AP association was not received. The example STAs 110a, 110b, 110d respond with a full or partial BF report that includes directional information (e.g., corresponding to a direction or angle that the STA is with respect to the AP). Because the example STAs 110a, 110b are within a threshold direction of each other, the example AP 106a groups the example STAs 110a, 110b into the example group 114 (e.g., corresponding to the STAs being within a threshold distance of each other) and transmits the group 114 to the example central server 102. The central server 102 generates a schedule (e.g., what frequency channels and/or times to use for communicating with the example STAs 110a-d of the environment 100), where the grouped STAs 110a, 110b will be scheduled for communications at different times and/or frequencies to avoid interference (while other STAs may all be scheduled at the same time and/or frequency). Once the grouping protocol is complete, the example AP1 106a will be connected to the STAs 110a, 110d and the example AP2 106b will be connected to the example STAs 110b, 110c utilizing the schedule from the central server 102.

Figure 2:
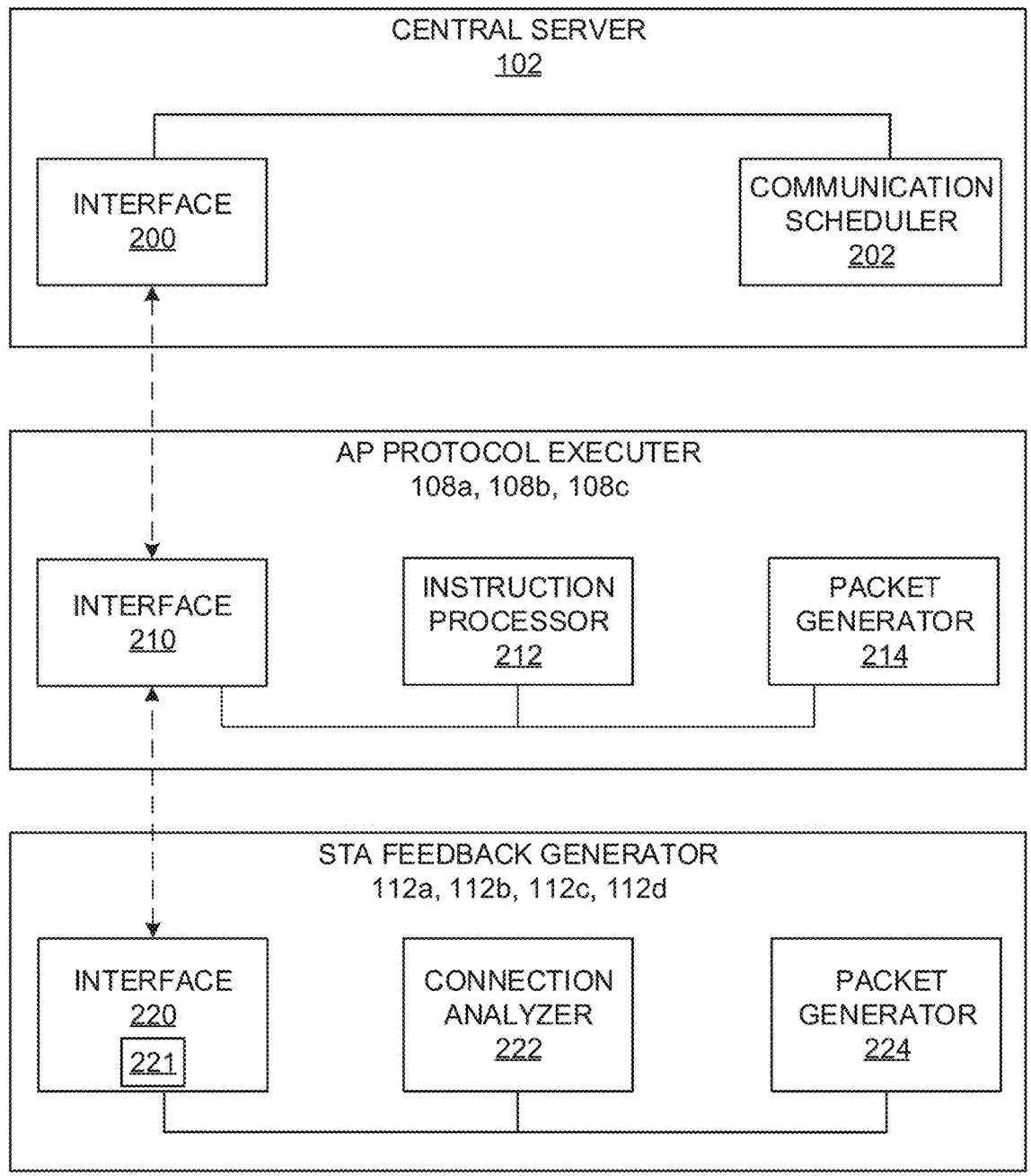
FIG. 2 is a block diagram of the example server, the example access point protocol executer, and the example station feedback generator of FIG. 1.

FIG. 2 is a block diagram of the example central server 102, one of the example AP protocol executer 108a-c, and one of the example STA feedback generators 112a-d of FIG. 1. The example central server 102 includes an example interface 200 and an example communications scheduler 202. The one of the example AP protocol executer 108a-c includes an example interface 210, an example instructions processor 212, and an example packet generator 214. The one of the example STA feedback generators 112a-d includes an example interface 220, an example channel estimator/receiver 221, an example connection analyzer 222, and an example packet generator 224.

The example interface 200 of the example central server 102 of FIG. 2 transmits instructions to the example APs 106a-c of the AP network 104 to initiate a grouping protocol for the example STAs 110a-d. The example interface 200 transmits instructions to the APs 106a-c via a wired and/or wireless connection. Additionally, the example interface 200 receives information (e.g., groupings) from the example APs 106a-b based on the grouping protocol. Additionally, once communication schedules are generated based on the groupings, the interface 200 transmits the schedules to the APs 106a-c.

The example communications scheduler 204 schedules the communications between the example APs 106a-c with the example STAs 110a-d based on the received feedback corresponding to the grouping protocol. For example, during the grouping protocol, the example communication scheduler 204 schedules communications between the example APs 106a-c and the example STAs 110a-d in any manner, so long as communications between the grouped STAs (e.g., the example STAs 110a-b in the example group 114) are not scheduled for simultaneous transmission. In such an example, the communication scheduler 204 may generate instructions to the example APs 106a-c corresponding to the grouped STAs 110a-b to ensure that the STAs are scheduled at different times and/or at difference frequency slots (e.g., channels).

The example interface 210 of one of the AP protocol executer 108a-c of FIG. 2 receives instructions from the example central server 102 and reports/associations from one or more of the example STAs 110a-d. For example, the example interface 210 interfaces with radio architecture (e.g., the example radio architecture 1000 of FIG. 10) to obtain data packets that have been sent to the AP. Additionally, the example interface 210 transmits information (e.g., data packets via the example radio architecture 1000 of FIG. 10) one or more of the example STA feedback generators 112a-d to elicit a feedback report(s) (e.g., STA-AP associations and/or BF reports). Additionally, the example interface 210 transmits STA groupings based on the feedback report(s).

The example instruction processor 212 of FIG. 1 processes instructions from the example central server 102. For example, the example instruction processor 212 processes instructions from the example central server 102 to determine that a grouping protocol is to be initiated. Additionally, the example instruction processor 212 determines which STAs are primary/secondary based on the STA-AP associations received by the example interface 210. In some examples, the instruction processor 212 determines which STAs should be grouped together based on BF reports from the primary and/or secondary STAs. For example, the instruction processor 212 compares the directional data from the primary and secondary STAs and determines that STAs should be grouped the STAs correspond to a same/similar direction (e.g., within a threshold range of an angle from the AP).

The example packet generator 214 of FIG. 2 generates data packets according the instructions from the example central server 102. For example, if the instructions from the example central server 102 corresponds to a grouping protocol, the example packet generator 214 generates a data packet (e.g., a collaborative beam forming (CBF) Null-data packet (NDP)) to elicit a report corresponding to channel measurements from one or more of the example STAs 110a-d. In such an example, the packet generator 214 may generate a packet that includes information related to the channel(s) that each STA 110a-d should listen to and take measurements on (e.g., SNR, RSSI, etc.). Once the STA-AP associations have been received, the example packet generator 214 generates a data packet (e.g., a training field) to elicit a report (e.g., a CQI report) including to BF reports corresponding to directional information from the primary and secondary STAs. In some examples, during channel estimation, the packet generator 214 generates a training field including a P-Matrix. For example, to enable precise channel estimation and interference estimation, training field information transmitted from the AP may be orthogonalized using the P-matrix (e.g., the size of the P-matrix being the same as the total number of STAs participating in the environment 100).

The example interface 220 of FIG. 2 of one of the STA feedback generators 112a-d of FIG. 2 receives data packets from one or more of the example APs 106a-c. For example, the example interface 220 interfaces with radio architecture (e.g., the example radio architecture 1000 of FIG. 10) to obtain data packets that have been sent to the STA. Additionally, the example interface 220 transmits data packets (e.g., via the example radio architecture 1000 of FIG. 10) to one or more of the example APs 106a-c including feedback report(s) (e.g., a signal strength, CQI, a report corresponding to primary and/or secondary STA-AP associations, and/or BF report).

The example connection analyzer 222 of FIG. 2, in conjunction with other components of the STA 110a-d, analyzes the connection on one or more frequency channels based on the instructions from the example APs 106a-c. For example, the connection analyzer 222 may sense packets on one or more frequency channels to determine the SNR and/or RSSI of the received data packets. In some examples, the connection analyzer 222 compares the RSSI, SNR, etc. measurements from the APs 106a-c to identify a primary AP (e.g., corresponding to the highest signal strength) and/or secondary AP(s) (e.g., corresponding to signal strengths that are not the highest but above a threshold). In some examples, the connection analyzer 222 measures a channel from the corresponding STA to each AP 106a-c in a coordinated set (e.g., the set of APs that can communicate with the STA) based on a received null data packet from the coordinate APs, one by one, to be able to generate BF feedback data. Alternatively, the example connection analyzer 222 may performs BF training with each AP independently. The connection analyzer 22 may perform a full BF response protocol (e.g., when the STA is a primary STA) or a partial BF response protocol (e.g., when the STA is a secondary STA). The example interface 220 includes an example channel estimator/receiver 221 to determine a transmitted signal based on training field information and a received signal using noise and/or interference estimations, as further described below in conjunction with FIG. 3.

The example packet generator 224 generates packets including reports to send to connected APs. For example, the packet generator 224 may generate a data packet corresponding to a primary and/or secondary AP-STA association, a CQI report corresponding to the channel estimation, and/or a BF report. In this manner, the relevant information can be forwarded to the example central server 102 to schedule communications between the example APs 106a-c and the example STAs 110a-d.

Figure 3:
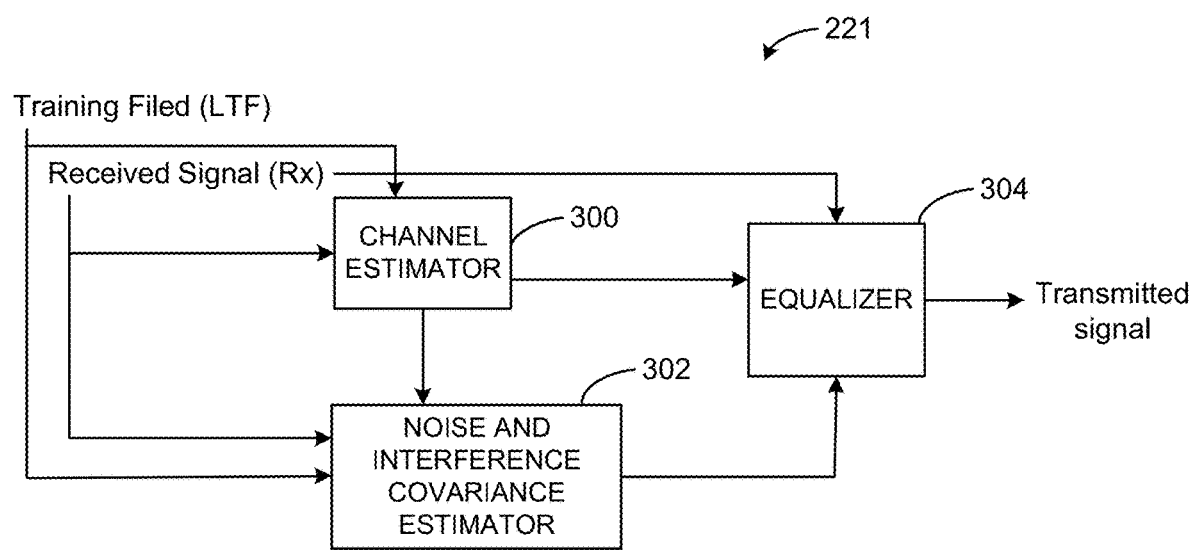
FIG. 3 is a block diagram of the example channel estimator/receiver of FIG. 2.

FIG. 3 is a block diagram of the example channel estimator/receiver 221 of FIG. 2 to determine a transmitted signal during channel estimation. The example channel estimator/receiver 221 may be a MMSE receiver, for example. The example channel estimator/receiver 221 includes an example channel estimator 300, an example noise and interference covariance estimator 302, and an example equalizer 304.

The example channel estimator 300 of FIG. 3 estimates the channel of the received signal based on training field information (e.g., identified in a long training field of a signal transmitted to the STA). For example, the channel estimator 300 may generate the channel estimation by correlating (e.g., using a mathematical model) the received signal with known characteristics identified in the training field information. Alternatively, the example channel estimator 300 may estimate the channel of the received signal based on any channel estimation technique.

The example noise and interference covariance estimator 302 of FIG. 3 generates a noise and interference covariance matrix based on the training field information, the received signal, and the estimated channel. For example, given a training signal X (e.g., nFFT×1), a received signal Y (e.g., nFFT×$N_{RX}$, where $N_{RX}$ is the number of antennas in the receiver), an estimated channel in the frequency domain H, and a number of chunks of frequency tones to estimate the covariance matrix L (e.g., L=$2^k$, where k=0, 1, . . . , log 2nFFT), the noise and interference covariance estimator 302 determines the noise and interference covariance matrix in every frequency tone ($N_{RX} \times N_{RX}$) using the below Equations 1 and 2.

$$Noise_k = y_k - H_k \cdot x_k \quad \text{(Equation 1)}$$

$$Q_k = Q_k = Noise_k \cdot Noise_k \quad \text{(Equation 2)}$$

Where $Q_k$ is the interference. Once the noise and interference is calculated, the noise and interference covariance estimator 302 estimates the covariance matrix $R_{nn}$ by average $Q_k$ over L tones. The noise covariance matrix is the same for the L tones.

The example equalizer 304 of FIG. 3 determines the transmitted signal based on the received signal, the channel estimation, and the noise and interference covariance matrix. In some examples, the example equalizer 304 may be an interference rejection combiner (IRC)-MMSE equalizer. The example equalizer 304 determines the transmitted signal in each carrier frequency using the below Equation 3.

$$W_{mmse} = (H' \cdot R_{nn}^{-1} \cdot H + + 1)^{-1} \cdot H' \cdot R_{nn}^{-1} \quad \text{(Equation 3)}$$

Where H is the estimated channel in each frequency with dimension ($N_{RX} \times N_S$). $N_{RX}$ is the number of receive antennas at each STA's receiver and Ns defines the number of data streams which are multiplexed in every channel and $R_{nn}$ (e.g., $N_{RX} \times N_{RX}$) is the noise and interface covariance matrix.

Figure 10:
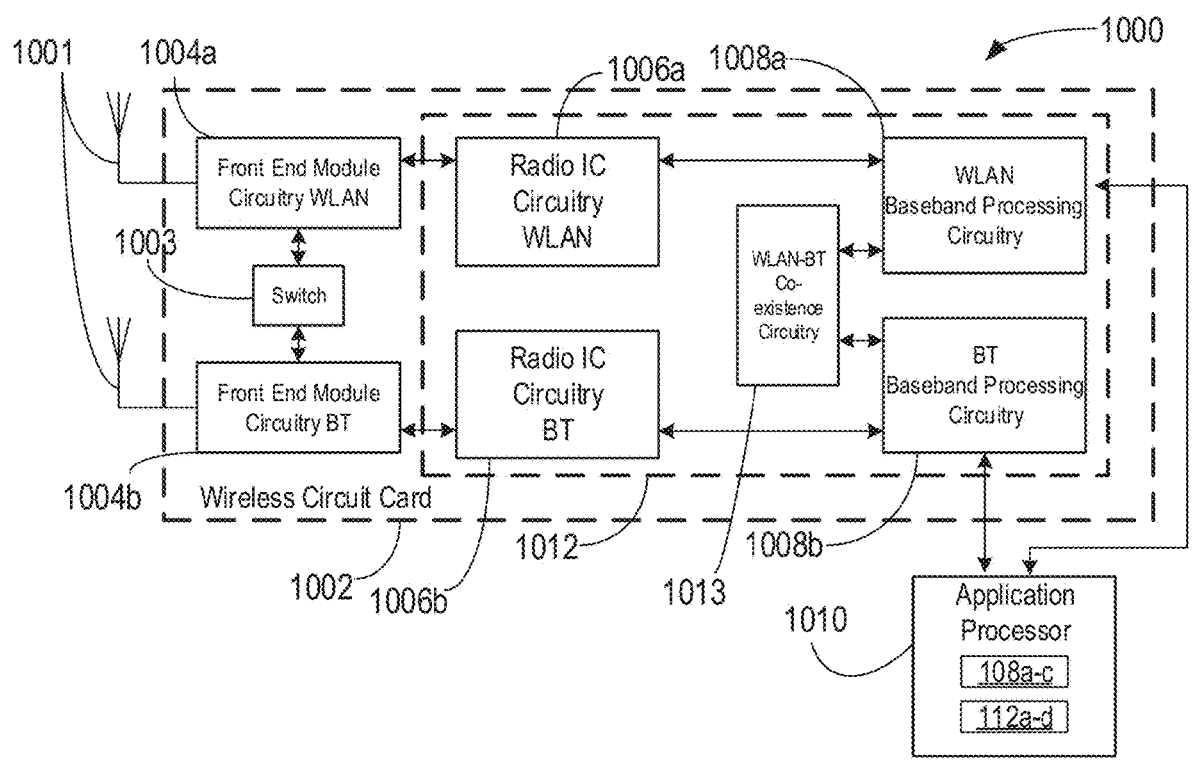
FIG. 10 is a block diagram of a radio architecture in accordance with some examples.

While an example manner of implementing the example central server 102, the example AP protocol executer 108a-c, and the example STA feedback generators 112a-d of FIG. 1 is illustrated in FIG. 2, one or more of the elements, processes and/or devices illustrated in FIG. 2 may be combined, divided, re-arranged, omitted, eliminated and/or implemented in any other way. Further, the example interface 200, the example communication scheduler 202, the example interface 210, the example instruction processor 212, the example packet generator 214, the example interface 220, the example connection analyzer 222, the example packet generator 224, the example channel estimator 300, the example noise and interference covariance estimator 302, the example equalizer 304, and/or, more generally, the example central server 102, the example AP protocol executer 108a-c, the example STA feedback generators 112a-d of FIG. 2, the example channel estimator/receiver 221, and/or the application processor 1010 of FIG. 10 may be implemented by hardware, software, firmware and/or any combination of hardware, software and/or firmware. Thus, for example, any of the example interface 200, the example communication scheduler 202, the example interface 210, the example instruction processor 212, the example packet generator 214, the example interface 220, the example connection analyzer 222, the example packet generator 224, the example channel estimator 300, the example noise and interference covariance estimator 302, the example equalizer 304, and/or, more generally, the example central server 102, the example AP protocol executer 108a-c, the example STA feedback generators 112a-d of FIG. 2, the example channel estimator/receiver 221, and/or the application processor 1010 of FIG. 10 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example communication scheduler 202, the example interface 210, the example instruction processor 212, the example packet generator 214, the example interface 220, the example connection analyzer 222, the example packet generator 224, the example channel estimator 300, the example noise and interference covariance estimator 302, the example equalizer 304, and/or, more generally, the example central server 102, the example AP protocol executer 108a-c, the example STA feedback generators 112a-d of FIG. 2, the example channel estimator/receiver 221, and/or the application processor 1010 of FIG. 10 is/are hereby expressly defined to include a non-transitory computer readable storage device or storage disk such as a memory, a digital versatile disk (DVD), a compact disk (CD), a Blu-ray disk, etc. including the software and/or firmware. Further still, the example link aggregator 104 of FIG. 1 may include one or more elements, processes and/or devices in addition to, or instead of, those illustrated in FIGS. 2, 3, and/or 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the example central server 102, the example AP protocol executer 108*a-c*, the example STA feedback generators 112*a-d*, the example channel estimator/receiver 221, and/or the application processor 1010 of FIGS. 2, 3, and/or 10 are shown in FIGS. 4-7. The machine readable instructions may be a program or portion of a program for execution by a processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 4-7, many other methods of implementing the example central server 102, the example AP protocol executer 108*a-c*, the example STA feedback generators 112*a-d*, the example channel estimator/receiver 221, and/or the application processor 1010 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 4:
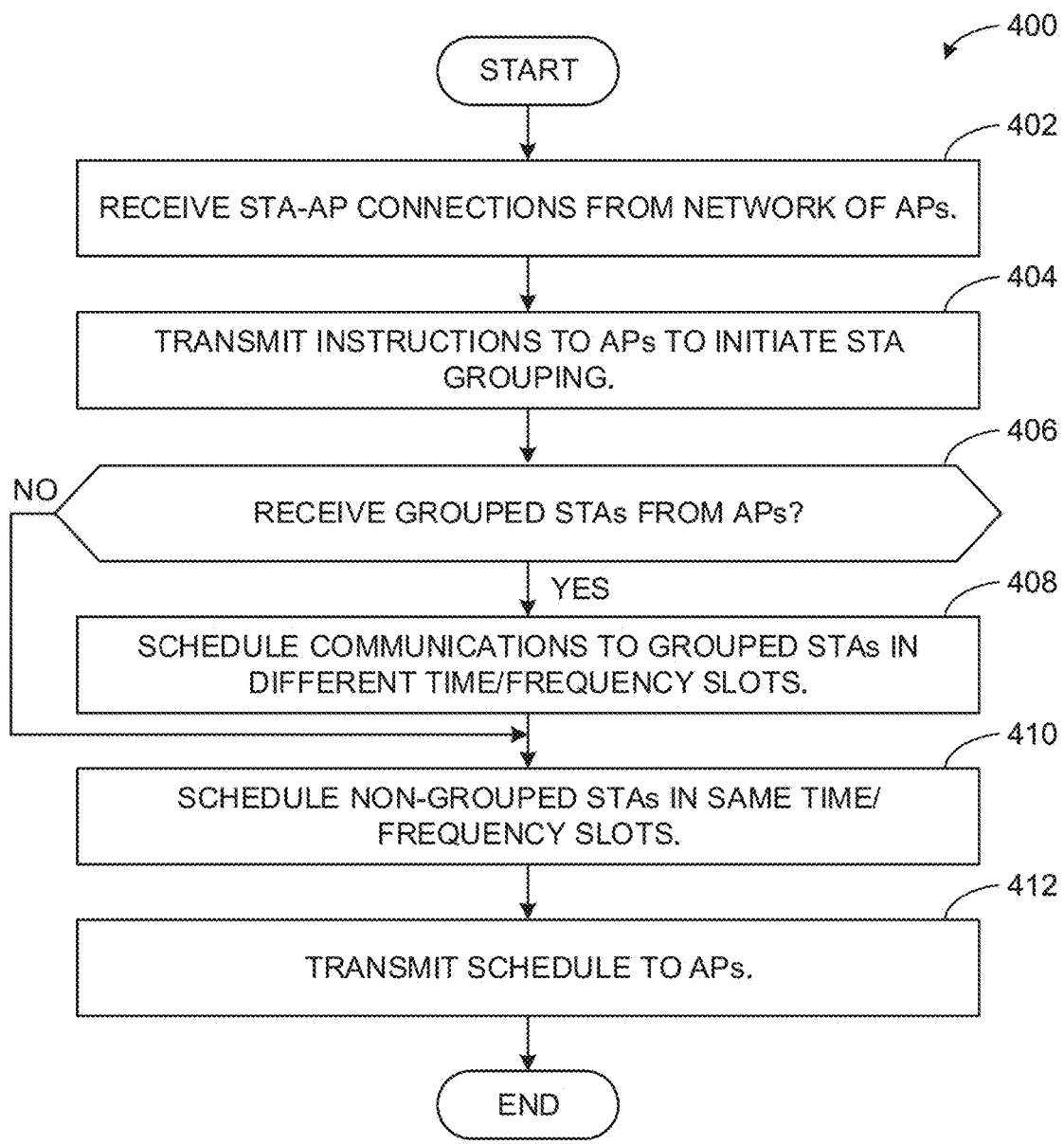
FIG. 4 is a flowchart representative of example machine readable instructions that may be executed to implement the example server of FIGS. 1 and/or 2.

FIG. 4 illustrates an example flowchart 400 representative of example machine readable instructions that may be executed by the example central server 102 of FIG. 1 to initiate a grouping protocol for scheduling. Although the flowchart 400 of FIG. 4 is described in conjunction with the example central server 102 of the example environment 100 of FIG. 1, the instructions may be executed by any server in any type of wireless environment.

At block 402, the example interface 200 receives the STA-AP connections from the network of APs 104. The example STA-AP connections may correspond to which STAs are currently connected to which APs and/or which possible STA-AP connections that could occur (e.g., all STA within the transmission range of each AP 106*a-c*). At block 404, the example interface 200 transmits instructions to the network of APs 104 to initiate the STA grouping protocol. At block 406, after the example APs 106*a-c* and the example STAs 110*a-d* identify groupings, as further described below in conjunction with FIGS. 4 and 5, the example interface 200 determines if the groups of the example STAs 110*a-d* from the example APs 106*a-c* have been received. Because the groups may only be sent if the STAs are located near each other (e.g., the location being determined based on the RSSI, SNR, etc.), if the STAs are not located near each other, then no groups will be received.

If the example interface 200 determines that a group has not been received (block 406: NO), the process continues to block 410. If the example interface 200 determines that one or more groups have been received (block 406: YES), the example communications scheduler 202 schedules communications to grouped STAs (e.g., the STAs 110*a-b* corresponding to the example group 114) in different time/frequency slots (block 408), to reduce/eliminate the effect of interference between the grouped STAs 110*a-b*. At block 410, the example communications scheduler 202 schedules the non-grouped STAs in the same time/frequency slot and/or any desired time/frequency slot. At block 412, the example interface 200 transmits the schedule to the example APs 106*a-c* in the example AP network 104.

Figure 5:
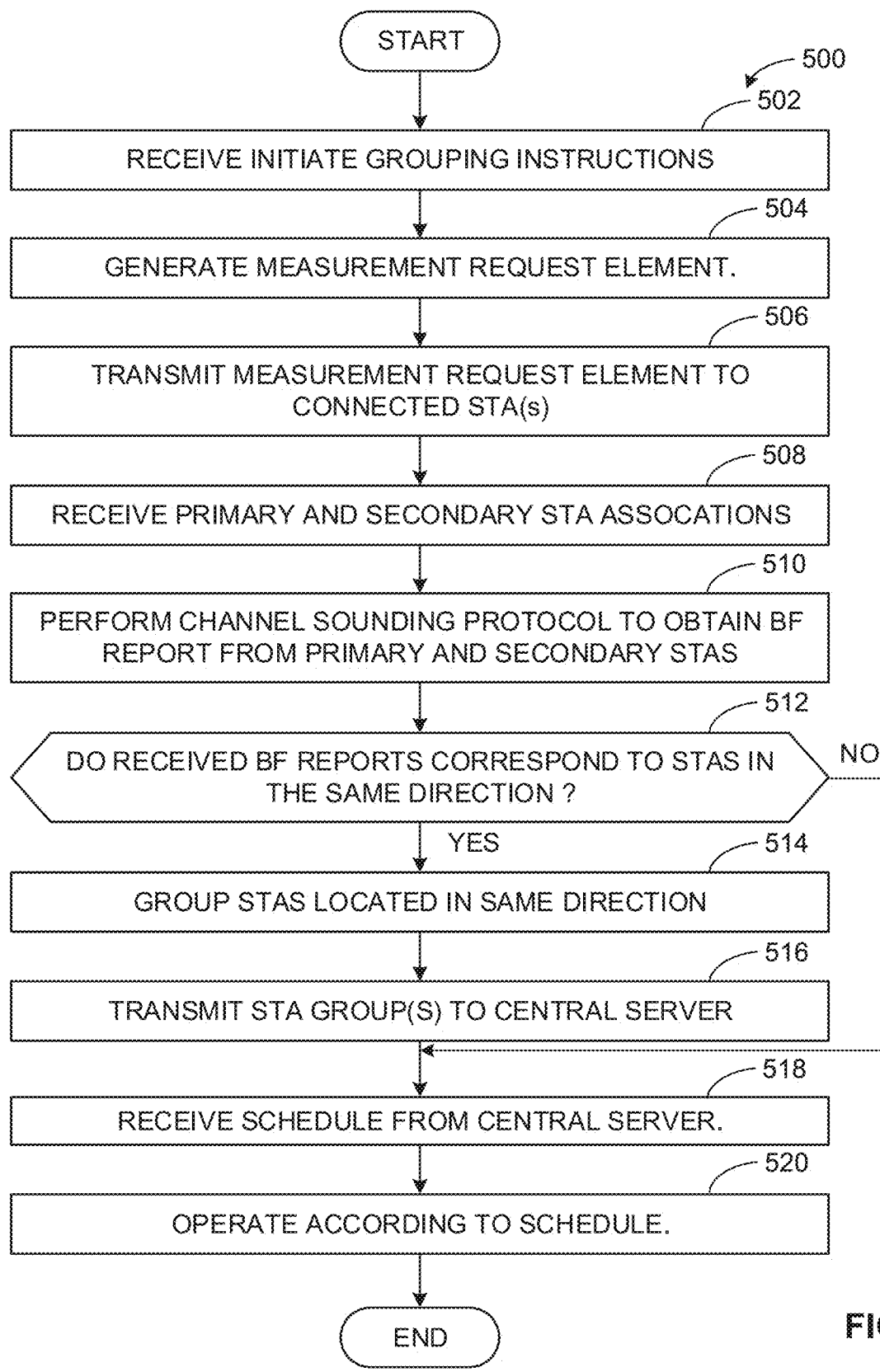
FIG. 5 is a flowchart representative of example machine readable instructions that may be executed to implement the example access point protocol executer of FIGS. 1 and/or 2.

FIG. 5 illustrates an example flowchart 400 representative of example machine readable instructions that may be executed by one or more of the example AP protocol executer 108*a-c* of FIG. 2 to elicit measurements from one or more of the example STAs 110*a-d* for a grouping protocol. Although the flowchart 500 of FIG. 5 is described in conjunction with the one or more example AP protocol executer 108*a-c* in the example environment 100 of FIG. 1, the instructions may be executed by any AP protocol executer in any wireless communication environment.

At block 502, the example interface 210 receives instructions to initiate the grouping protocol from the example central server 102. For example, the instructions may correspond to a CBF NDP that includes information corresponding to how/when to instruct one or more of the example STAs 110*a-d* to perform a measurement (e.g., a RSSI measurement, a SNR ratio, etc.). At block 504, the example packet generator 214 generates a measurement request element (e.g., data packet). The measurement request element corresponds to instructions defining which channels a connected STA should listen to (e.g., to perform the measurement). At block 506, the example interface 210 transmits the measurement request element to the connected STAs. In some examples, the packet generator 214 may include timing instructions in the measurement request, corresponding to when to sense.

At block 508, the example interface 210 receives primary and/or secondary STA associations from the STAs that have determined that the AP-STA association is primary or secondary, as further described below in conjunction with FIG. 6. For example, if the RSSI measurement of the signal from the AP 106a to the STA 110a is higher than the other RSSI measurements, the STA1 110a determines that the AP 106a is a primary AP (e.g., a primary AP-STA association). Additionally, if the example STA2 110b determines that the RSSI measurement of the signal from the AP 106a is not the primary but above a threshold, the STA2 110b may determine that the AP 106a is a secondary AP (e.g., a secondary AP-STA associations). In such an example, the example interface 210 will receive the primary AP-STA association from the example STA1 110a (e.g., identifying that the AP 106a and the STA 110a are primarily associated) and the secondary AP-STA association from the example the example STA2 110b (e.g., identifying that the AP 106a and the STA 110a are secondarily associated).

At block 510, the example AP protocol executer 108a, 108b, 108c performs a channel sounding protocol to obtain BF reports from the primary and secondary STAs. For example, the example packet generator 214 generates a collaborative beamforming (CBF) null data packet (NDP) announcement to initiate the sounding protocol. Once generated, the example interface 210 transmits the CBF NDP announcement to inform the STAs 110a-d that channel sounding will be performed. Once the CBF NDP announcement is transmitted, the example instruction processor 212 determines which of the STAs are primary and secondary (e.g., based on the received primary and/or secondary associations) and the example packet generator 214 generates an NDP corresponding to how the primary and/or secondary STAs should perform channel sounding. The example interface 210 transmits the NDP and transmits a trigger frame (e.g., generated by the packet generator 214) to initiate responses from the primary and/or secondary STAs with BF reports. The channel sounding process is further described below in conjunction with FIG. 8.

At block 512, the example instruction processor 212 processes the returned BF reports from the primary and/or secondary STAs to determine if the received BF reports correspond to STAs in the same/similar direction (e.g., within a threshold angle amount). For example, if the AP protocol executer 108a of the example AP 106a receives a BF report from the primary STA1 110a corresponding to a first direction (e.g., angle) and a BF report from a secondary STA2 110b corresponding to a second direction (e.g., angle) within a threshold range of the first direction, the example instruction processor 212 determines that the example STAs 110a, 110b are in the same/similar direction. If the example instruction processor 212 determines that the received BF reports do not correspond to STAs in the same/similar direction (block 512: NO), the process continues to block 518.

If the example instruction processor 212 determines that the received BF reports correspond to STAs in the same/similar direction (block 512: YES), the example instruction processor 212 groups the STAs located in the same/similar direction (block 514) (e.g., corresponding to the example group 114 of FIG. 1) At block 516, the example interface 210 transmits the STA group(s) to the central server 102. In this manner, the central server 102 can schedules the STAs 100a-d according to the grouping(s). At block 414, the example interface 200 receives scheduling information from the example central server 102. At block 416, the example AP 106a-c operates according to the received scheduling information. For example, the interface 210 may transmit the scheduling information to another processor (e.g., the example application processor 1010 of FIG. 10), to ensure that the communications to the connected STAs follows the received scheduling information. The scheduling information ensures that grouped APs (e.g., the example group 114) are not scheduled by one or more of the APs at the same time and/or frequency.

Figure 6:
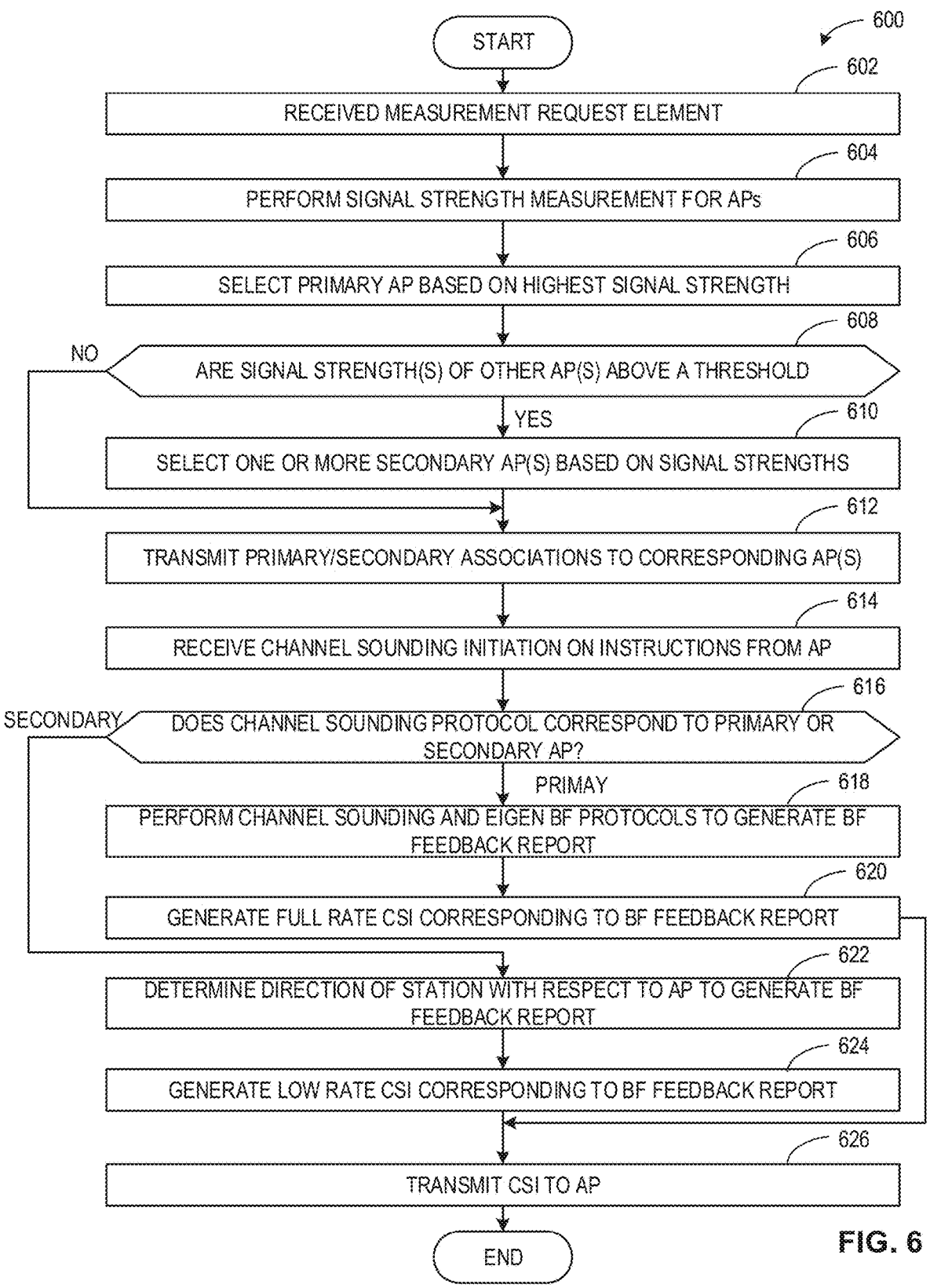
FIG. 6 is a flowchart representative of example machine readable instructions that may be executed to implement the example station feedback generator of FIGS. 1 and/or 2.

FIG. 6 illustrates an example flowchart 600 representative of example machine readable instructions that may be executed by one or more of the example STA feedback generators 112a-d of FIG. 2 to respond to a measurement request from an AP. Although the flowchart 600 of FIG. 6 is described in conjunction with one or more of the example STA feedback generators 112a-d in the example environment 100 of FIG. 1, the instructions may be executed by any STA feedback generator in any time of wireless communications environment.

At block 602, the example interface 220 receives a measurement request element from a connected AP. For example, the example STA feedback generator 112a may receive a measurement element from the example AP 106a. At block 604, the example connection analyzer 222 (e.g., in conjunction with the example interface 220 and the radio architecture 1000 of FIG. 10) perform a signal strength measurement (e.g., RSSI measurement) for the APs 108a-c. At block 606, the example connection analyzer 222 selects a primary AP based on the highest signal strength (e.g., the highest RSSI value). At block 608, the example connection analyzer 222 determines if there are any additional measured signal strength(s) corresponding to other APs that are above a threshold. For example, there may be an RSSI value for one or more APs (e.g., other than the selected primary AP) that is above a predefined threshold value corresponding to a secondary AP association.

If the example connection analyzer 222 determines that there is not a signal strength value of an AP that is above the threshold (block 608: NO), the process continues to block 612. If the example connection analyzer 222 determines that there is one or more signal strength values of one or more AP(s) that is above the threshold (block 608: YES), the example connection analyzer 222 selects one or more secondary AP(s) based on the signal strength (block 610). The number of possible secondary associations may be predetermined. For example, the number of secondary associations may be unlimited (e.g., so long as the signal strength associations is satisfied) or may be limited to no more than X associations, where X is a predefined number.

At block 612, the example interface 220 instructs the radio architecture 1000 of FIG. 10 to transmit the primary and/or secondary associations to the corresponding AP(s). For example, if the example STA feedback generator 112b of STA2 110b determines that the AP 106a is secondary and the AP 106b is primary, the example radio architecture 1000 of the STA2 110b transmits the secondary STA-AP association to the AP 106a and the primary STA-AP association to the AP 106b. The example packet generator 224 generates one or more data packets and/or signals corresponding to the primary and/or secondary associations that is transmitted. At block 614, the example connection analyzer 222 receives a channel sounding protocol initiation based on instructions from an AP (e.g., a primary AP or a secondary AP) received via the radio architecture 1000 and the interface 220. The channel sounding protocol is initiated based on the interface 220 receiving (e.g., obtaining from the radio architecture 1000) a CBF NDP announcement. Additionally, the interface receives (e.g., via the radio architecture 1000) an NDP from the primary and/or secondary APs corresponding to how to perform the sounding protocol.

At block 616, the example connection analyzer 222 processes the received NDP to determine if the channel sounding protocol corresponds to instructions from a primary AP (e.g., corresponding to a primary association) or a secondary AP (e.g., corresponding to a secondary association). If the example connection analyzer 222 determines that the channel sounding protocol corresponds to instructions from a primary AP (block 616: PRIMARY), the example connection analyzer 222 performs a channel sounding and eigen BF protocols for all eigen values to generate a BF feedback report (block 618). At block 620, the example packet generator 224 generates a full rate CSI corresponding to the BF feedback report. If the example connection analyzer 222 determines that the channel sounding protocol corresponds to instructions from a secondary AP (block 616: SECONDARY), the example connection analyzer 222 determines a direction of the STA with respect to the AP to generate a BF feedback report (block 622). For example, instead of performing a full sounding protocol with eigen BF protocols (e.g., as performed in block 618), the connection analyzer 222 may reduce the amount of processing steps by performing a partial sounding protocol with the largest eigen BF value as opposed to all eigen values. At block 624, the example packet generator 224 generates a low rate CSI corresponding to the BF feedback report. At block 626, the example interface 220 transmits the CSI (e.g., the high rate or low rate CSI) to the AP that transmitted the channel sounding initiation instructions. As described above, the BF feedback reports may be used by the APs 106*a-c* and/or the central server 102 to ensure that two devices within a threshold distance of one another are grouped so that they are not scheduled at the same time and/or frequency.

Figure 7:
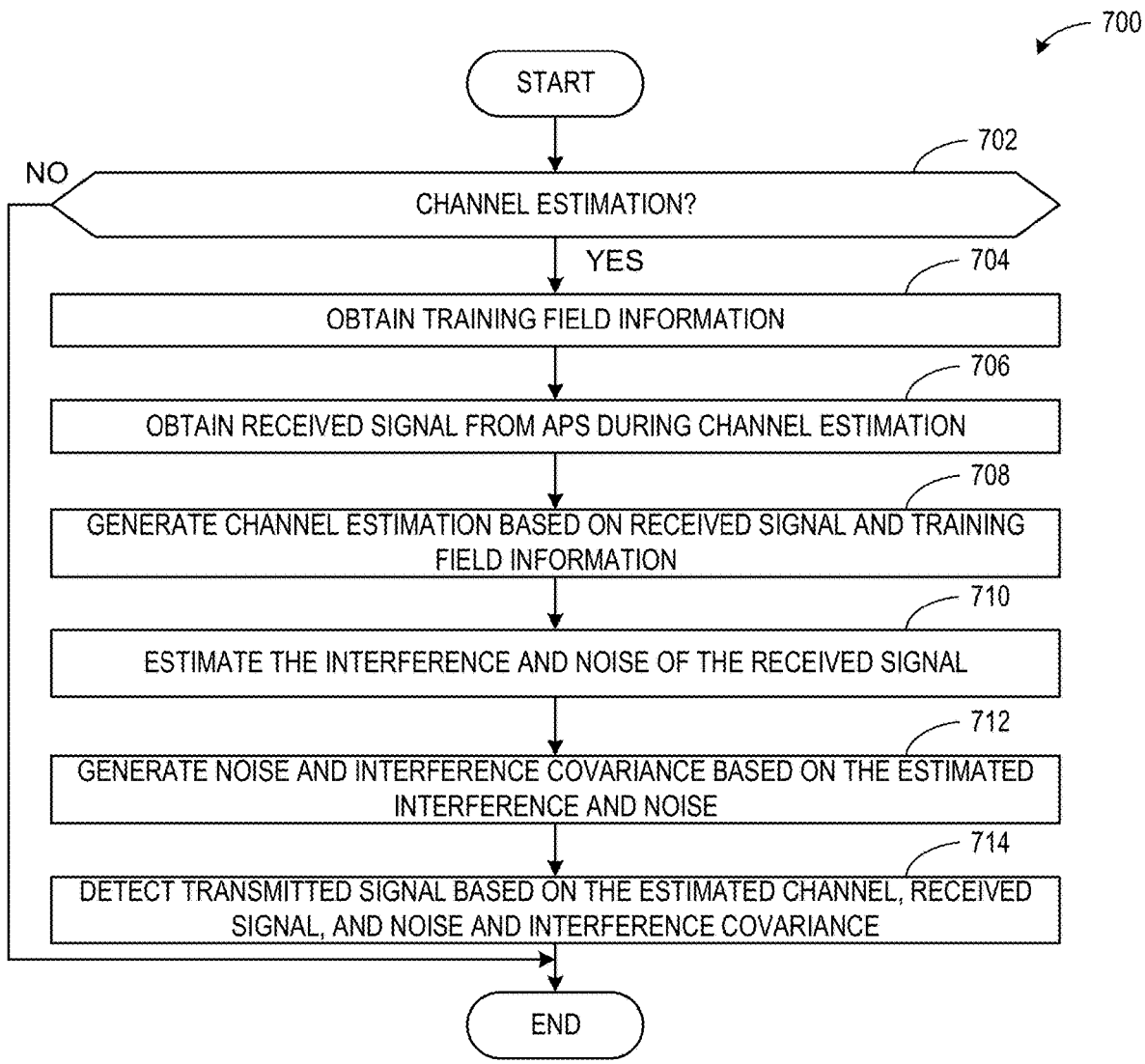
FIG. 7 is a flowchart representative of example machine readable instructions that may be executed to implement the example channel estimator/receiver of FIGS. 2 and/or 3.

FIG. 7 illustrates an example flowchart 600 representative of example machine readable instructions that may be executed by one or more of the example channel estimator/receiver 221 to determine a transmitted signal from a received signal. Although the flowchart 700 of FIG. 7 is described in conjunction with one or more of the example STA feedback generators 112*a-d* in the example environment 100 of FIG. 1, the instructions may be executed by any STA feedback generator in any time of wireless communications environment.

At block 702, the example application processor 1010 of FIG. 1 determines if channel estimation is to be performed. For example, the interface 220 receives instructions and the application processor 1010 processes the instructions to determine if the received instructions correspond to a channel estimation. If the application processor 1010 determines that channel estimation is not being performed (block 702: NO), the process ends. If the application processor 1010 determines that the channel estimation is being performed (block 702: YES), the example channel estimator 300 and the example noise and interference covariance estimator 302 obtain (e.g., via the radio architecture 1000 and the interface 220) the training field(s) (e.g., the long training field) information (block 704). The training field information may be obtained during initial communications (e.g., during channel estimation protocols). At block 706, the example channel estimator 300 and the example noise and interference covariance estimator 302 obtain (e.g., via the radio architecture 1000 and the interface 220) a received signal from one or more of the APs 106*a-c* during channel estimation. The received signal corresponds to the entire received signal across a number of frequency channels.

At block 708, the example channel estimator 300 generates a channel estimation of the received signal based on the received signal and the training filed information. For example, the channel estimator 300 may generate the channel estimation by correlating (e.g., using a mathematical model) the received signal with known characteristics identified in the training field information. At block 710, the example noise and interference covariance estimator 302 estimates the interference and noise of the received signal. For example, the noise and interference covariance estimator 302 may determine the noise of the received signal and the interference using the above Equations 1 and/or 2. At block 712, the example noise and interference covariance estimator 302 generates a noise and interference covariance based on the estimated interference and noise. For example, the noise and interference covariance estimator 302 generates the noise and interference covariance by averaging $Q_k$ from Equation 2 over L tones. At block 714, the example MMSE equalizer 304 detects the transmitted signal based on the estimated channel, the received signal, and the noise and interference covariance. For example, the MMSE equalizer 304 determiners the transmitted signal based on the above-Equation 3.

Figure 8:
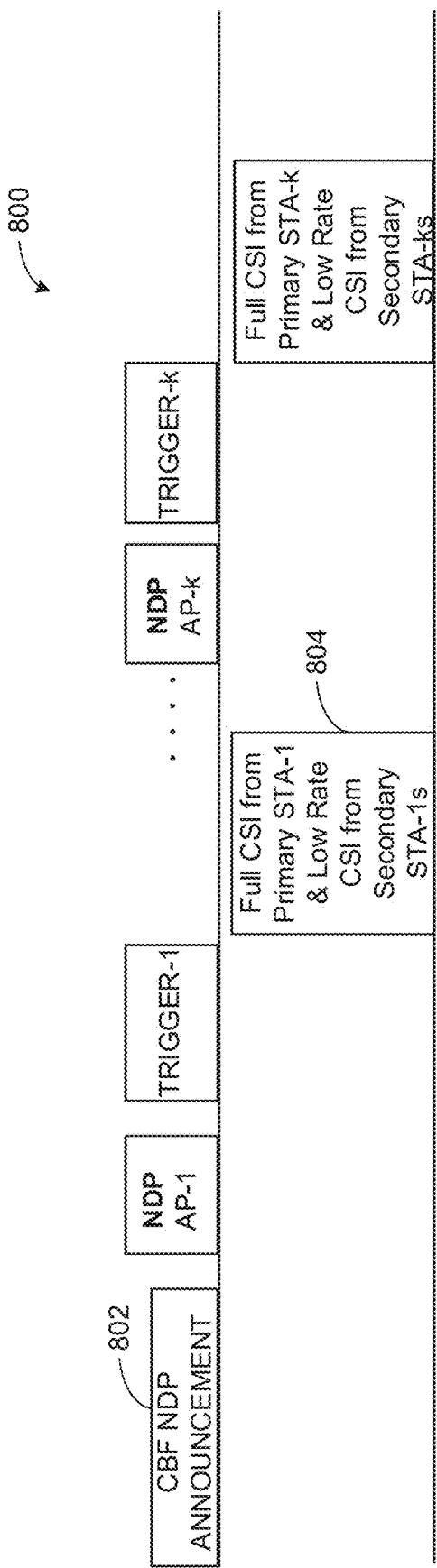
FIG. 8 illustrates an example timing protocol diagram and an example collaborative beamform null data packet announcement that may be transmitted by the server to the access points of FIG. 1.

FIG. 8 illustrates an example timing protocol diagram 800 and an example collaborative beamform null data packet announcement 802 that may be transmitted by the server 102 to the AP network 104 of FIG. 1 to initiate the obtaining of data corresponding to a grouping protocol. As shown in the example timing protocol diagram 800, the example central server 102 transmits CBF NDP announcement 802 to the AP network 104. In the example timing protocol 800, the first example AP 106*a* transmits the NDP to the primary and secondary STAs to elicit response(s) (e.g., the full or low rate channel sequence indicator (CSI)). In the example of FIG. 8, the example AP transmits a trigger frame to initiate the primary and/or secondary STAs to perform the measurements. Alternatively, the timing information may be included in the NDP. The process continues for each AP. The example null data packet announcement 802 of FIG. 8 includes multiple frames that correspond to frame control, receiver address (RA), transmitter address (TA), sound sequencing information, feedback report type (e.g., RSSI, SNR, BF, CQI, etc.) and information corresponding to each AP and/or STA. Once the trigger frame is transmitted by the first AP. The primary and/or secondary STA(s) corresponding to the first AP perform channel sounding and transmit BF reports to the first AP. As described above, the primary STA transmits a full CSI response and the secondary STA(s) transmit low rate CSI response(s). The process continues for the remaining APs in the AP network until the each AP has pulled BF reports for each of the corresponding primary and/or secondary STAs.

Figure 9:
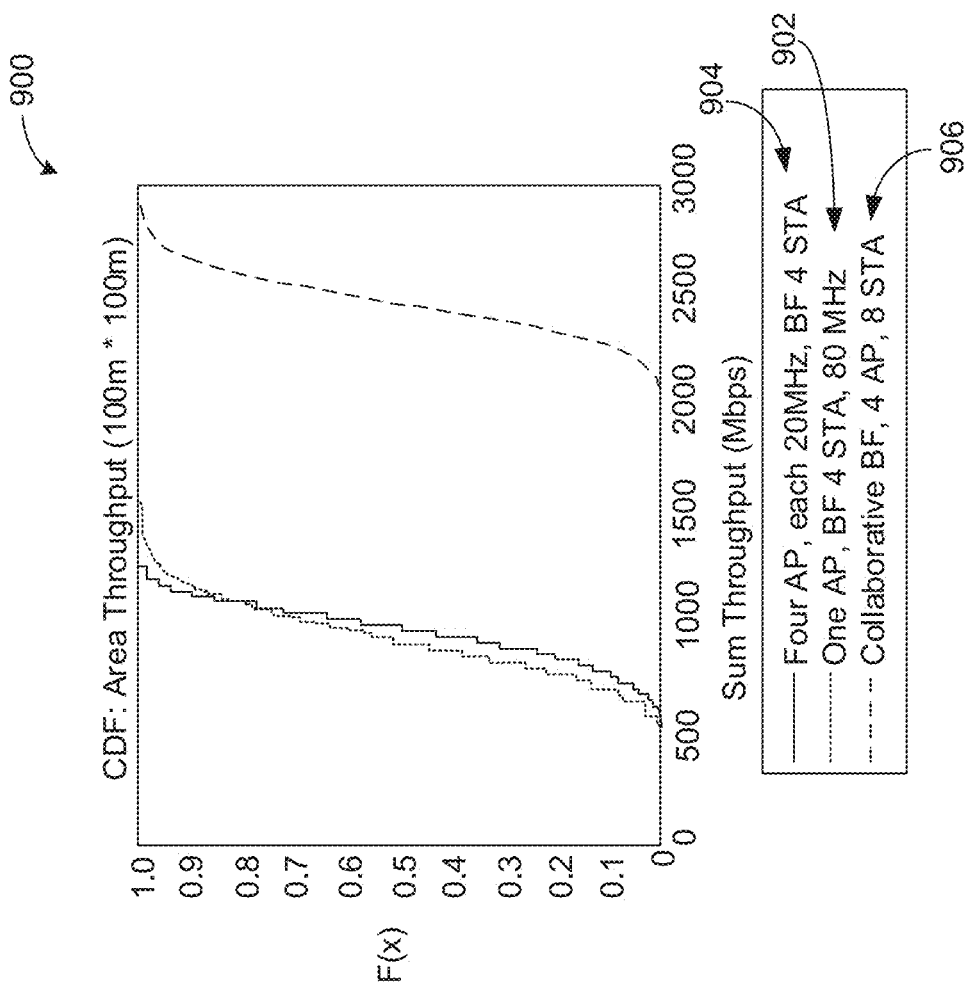
FIG. 9 illustrates an example diagram illustrating the area throughput of the wireless communication environment of FIG. 1.

FIG. 9 is an example timing diagram 900 illustrating an example single AP area throughput 902, an example four AP area throughput 904, and an example collaborative BF area throughput 906. The example single AP area throughput 902 corresponds to the sum throughout for a single-AP with 90 MHz bandwidth performing MU BF to 4 STAs. The example four AP area throughput 904 corresponds to the sum throughput for four APs, each in 20 MHz frequency channel and MU BF to 4 STAs. The example collaborative BF area throughput 906 corresponds to the example AP network 104 of FIG. 1. As shown in the example timing diagram 900, the example BF area throughput 906 corresponds to approximately a 150% increase in the sum throughput.

FIG. 10 is a block diagram of a radio architecture 1000 in accordance with some embodiments that may be implemented in any one of the example APs 106*a-c* and/or the example STAs 110*a-d* of FIG. 1. Radio architecture 1000 may include radio front-end module (FEM) circuitry 1004a-b, radio IC circuitry 1006a-b and baseband processing circuitry 1008a-b. Radio architecture 1000 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a link aggregator for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 1000 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1000 may be part of a Wi-Fi communication station (STA) such as a wireless access point (AP), a base station or a mobile device including a Wi-Fi device. In some of these embodiments, radio architecture 1000 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 1000 may also be suitable to transmit and/or receive communications in accordance with other techniques and standards.

In some embodiments, the radio architecture 1000 may be configured for high-efficiency Wi-Fi (HEW) communications in accordance with the IEEE 802.11ax standard. In these embodiments, the radio architecture 1000 may be configured to communicate in accordance with an OFDMA technique, although the scope of the embodiments is not limited in this respect.

In some other embodiments, the radio architecture 1000 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008b may be compliant with a Bluetooth (BT) connectivity standard such as Bluetooth, Bluetooth 3.0 or Bluetooth 5.0, or any other iteration of the Bluetooth Standard. In embodiments that include BT functionality as shown for example in FIG. 10, the radio architecture 1000 may be configured to establish a BT synchronous connection oriented (SCO) link and or a BT low energy (BT LE) link. In some of the embodiments that include functionality, the radio architecture 1000 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 10, the functions of a BT radio card and WLAN radio card may be combined on a single wireless radio card, such as single wireless radio card 1002, although embodiments are not so limited, and include within their scope discrete WLAN and BT radio cards In some embodiments, the radio-architecture 1000 may include other radio cards, such as a cellular radio card configured for cellular (e.g., 5GPP such as LTE, LTE-Advanced or 7G communications).

In some IEEE 802.11 embodiments, the radio architecture 1000 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
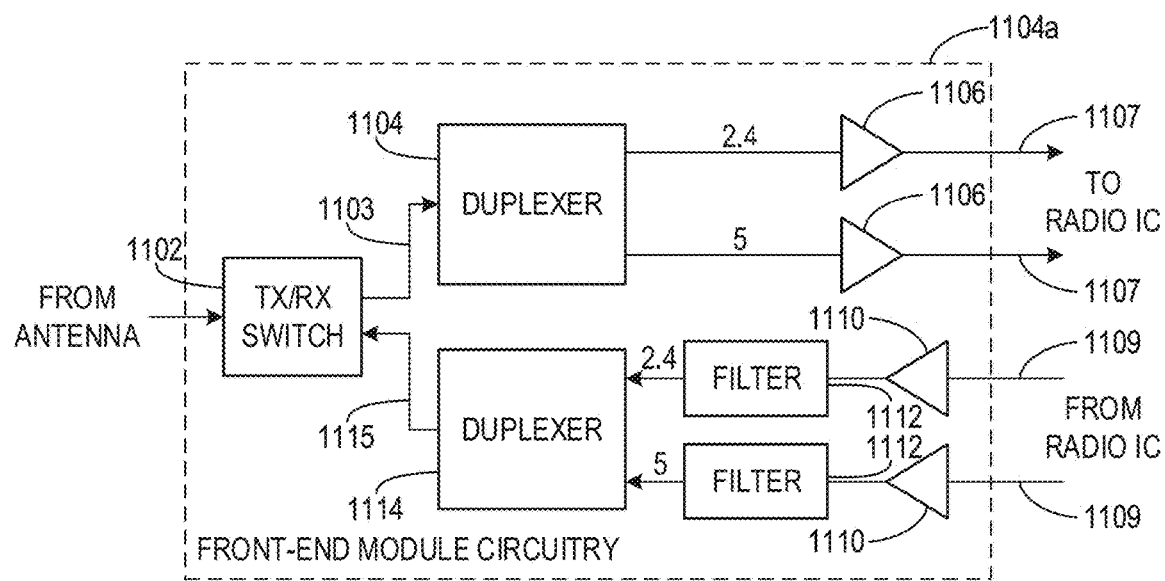
FIG. 11 illustrates an example front-end module circuitry for use in the radio architecture of FIG. 10 in accordance with some examples.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 5 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004a as the one used for WLAN communications.

Figure 12:
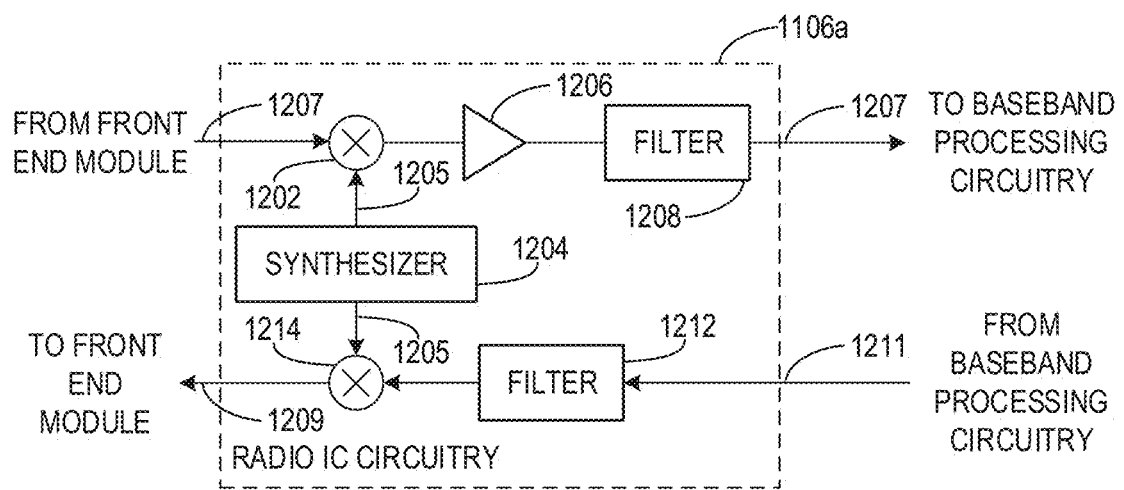
FIG. 12 illustrates an example radio IC circuitry for use in the radio architecture of FIG. 10 in accordance with some examples.

FIG. 12 illustrates radio IC circuitry 1006a in accordance with some embodiments. The radio IC circuitry 1006a is one example of circuitry that may be suitable for use as the WLAN or BT radio IC circuitry 1006a/1206b (FIG. 10), although other circuitry configurations may also be suitable. Alternatively, the example of FIG. 12 may be described in conjunction with the example BT radio IC circuitry 1006b.

In some embodiments, the radio IC circuitry 1006a may include a receive signal path and a transmit signal path. The receive signal path of the radio IC circuitry 1006a may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, up-conversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004*a-b* (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008*a-b* (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a-b*. The baseband signals 1211 may be provided by the baseband processing circuitry 1008*a-b* and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1204 may be provided by a voltage controlled oscillator (VCO), although that is not a requirement. A divider control input may further be provided by either the baseband processing circuitry 1008*a-b* (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example AP protocol executer 108*a-c* and/or one of the example STA feedback generator 112*a-c* (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
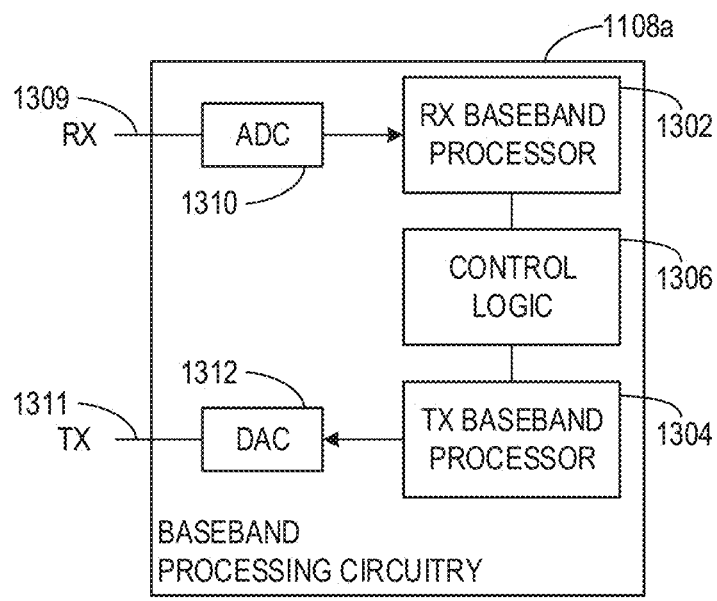
FIG. 13 illustrates an example baseband processing circuitry for use in the radio architecture of FIG. 10 in accordance with some examples.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 123 may be used to implement the example BT baseband processing circuitry 1008*b* of FIG. 10.

The baseband processing circuitry 1008*a* may include a receive baseband processor (RX BBP) 1302 for processing receive baseband signals 1209 provided by the radio IC circuitry 1006*a-b* (FIG. 10) and a transmit baseband processor (TX BBP) 1304 for generating transmit baseband signals 1211 for the radio IC circuitry 1006*a-b*. The baseband processing circuitry 1008*a* may also include control logic 1306 for coordinating the operations of the baseband processing circuitry 1008*a*.

In some embodiments (e.g., when analog baseband signals are exchanged between the baseband processing circuitry 1008*a-b* and the radio IC circuitry 1006*a-b*), the baseband processing circuitry 1008*a* may include ADC 1310 to convert analog baseband signals 1309 received from the radio IC circuitry 1006*a-b* to digital baseband signals for processing by the RX BBP 1302. In these embodiments, the baseband processing circuitry 1008*a* may also include DAC 1312 to convert digital baseband signals from the TX BBP 1304 to analog baseband signals 1311.

In some embodiments that communicate OFDM signals or OFDMA signals, such as through baseband processor 1008*a*, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio-architecture 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 14:
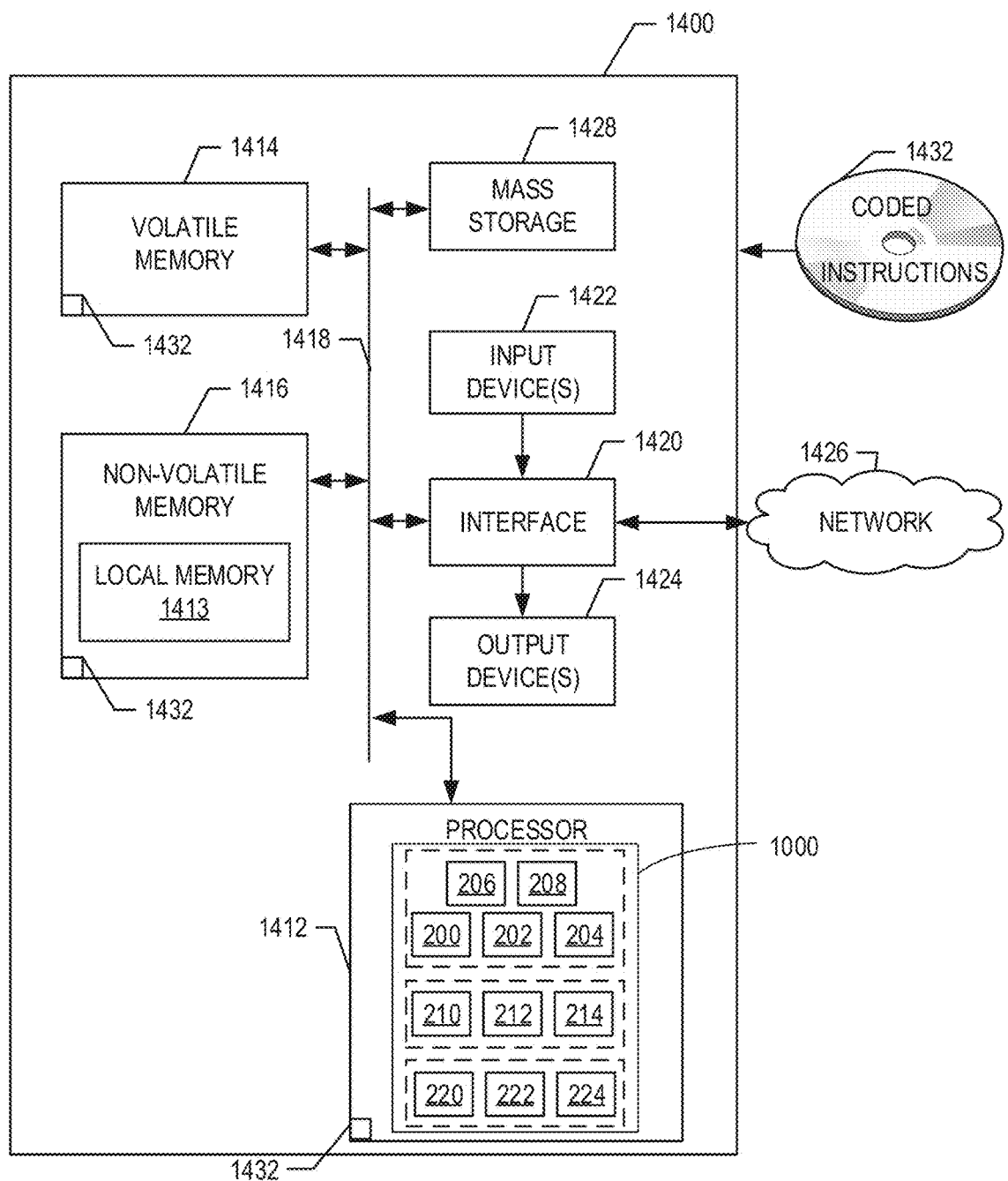
FIG. 14 is a block diagram of a processor platform structured to execute the example machine readable instructions of FIGS. 4-7 to implement the any one of, or any combination of, the server, the access point protocol executer, and/or the station feedback generator of FIGS. 1, 2, and/or 3.

FIG. 14 is a block diagram of an example processor platform 1400 structured to execute the instructions of FIGS. 4-7 to implement any one, or combination, of the example central server 102, the example AP protocol executer 108*a-c*, the example STA feedback generators 112*a-d*, the example channel estimator/receiver 221, and/or the example application processor 1010 of FIGS. 2, 3, and/or 10. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the example the example processor 1412 may be one or more processors used to implement any one, or combination, of the example interface 200, the example communication scheduler 202, the example interface 210, the example instruction processor 212, the example packet generator 214, the example interface 220, the example connection analyzer 222, and the example packet generator 224 of FIG. 2, the example channel estimator 300, the example noise and interference covariance estimator 302, and the example equalizer 304 of FIG. 3, and/or the example application processor 1010 of FIG. 10.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, a keyboard, a button, a mouse, a touchscreen, a track-pad, a trackball, and/or isopoint.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 4-7 may be stored in the mass storage device 1428, in the volatile memory 1414, in the non-volatile memory 1416, and/or on a removable non-transitory computer readable storage medium such as a CD or DVD.

Example 1 includes an apparatus to perform a grouping protocol, the apparatus comprising an interface to transmit first instructions to a first station and a second station to perform a signal measurement protocol, responsive to obtaining a first primary association from the first station and a secondary association or a second primary association from the second station, transmit second instructions to the first station to provide first directional information and the second station to provide second directional information, a processor to, when the first directional information corresponds to a first value within a threshold range of a second value corresponding to the second directional information, group the first station and the second station, and the interface to transmit information corresponding to the group to a server to schedule communications between a first and second access point and the first station and the second station.

Example 2 includes the apparatus of example 1, wherein the signal measurement protocol corresponds to a received signal strength indicator measurement.

Example 3 includes the apparatus of example 1, wherein the first primary association corresponds to a highest signal strength measured during the signal measurement protocol and the secondary association corresponds to a signal strength measured during the signal measurement protocol being above a threshold.

Example 4 includes the apparatus of example 1, wherein the grouping corresponds to the first station and the second station being within a threshold distance of each other.

Example 5 includes the apparatus of example 1, wherein the communications include first communications and second communications, the server to schedule the first communications for the first station and second communications for the second station at at least one of a different time or a different frequency.

Example 6 includes the apparatus of example 1, wherein the interface is to transmit the first instructions to a third station to perform the signal measurement, and when the at least one of a third primary association or a second secondary association is not received from the third station, refrain from sending the second instructions to the third station.

Example 7 includes the apparatus of example 1, wherein the first station is connected to the first access point and the second station is connected to the second access point.

Example 8 includes the apparatus of example 1, wherein the interface is to receive a schedule from the server, and the processor is to facilitate communications with the first station according the schedule.

Example 9 includes the apparatus of example 1, wherein the interface is to transmit at least one of the first instructions, the second instructions, or the information by instructing radio architecture.

Example 10 includes a tangible computer readable storage medium comprising instructions which, when executed, cause a machine to at least transmit first instructions to a first station and a second station to perform a signal measurement protocol, responsive to obtaining a first primary association from the first station and a secondary association or a second primary association from the second station, transmit second instructions to the first station to provide first directional information and the second station to provide second directional information, when the first directional information corresponds to a first value within a threshold range of a second value corresponding to the second directional information, group the first station and the second station, and transmit information corresponding to the group to a server to schedule communications between a first and second access point and the first station and the second station.

Example 11 includes the computer readable storage of example 10, wherein the signal measurement protocol corresponds to a received signal strength indicator measurement.

Example 12 includes the computer readable storage of example 10, wherein the first primary association corresponds to a highest signal strength measured during the signal measurement protocol and the secondary association corresponds to a signal strength measured during the signal measurement protocol being above a threshold.

Example 13 includes the computer readable storage of example 10, wherein the grouping corresponds to the first station and the second station being within a threshold distance of each other.

Example 14 includes the computer readable storage of example 10, wherein the communications include first communications and second communications, the instructions to cause the machine to schedule the first communications for the first station and second communications for the second station at at least one of a different time or a different frequency.

Example 15 includes the computer readable storage of example 10, wherein the instructions cause the machine to transmit the first instructions to a third station to perform the signal measurement, and when the at least one of a third primary association or a second secondary association is not received from the third station, refrain from sending the second instructions to the third station.

Example 16 includes the computer readable storage of example 10, wherein the first station is connected to the first access point and the second station is connected to the second access point.

Example 17 includes the computer readable storage of example 10, wherein the instructions cause the machine to receive a schedule from the server, and facilitate communications with the first station according the schedule.

Example 18 includes the computer readable storage of example 10, wherein the instructions cause the machine to transmit at least one of the first instructions, the second instructions, or the information by instructing radio architecture.

Example 19 includes a method to perform a grouping protocol, the method including transmitting first instructions to a first station and a second station to perform a signal measurement protocol, responsive to obtaining a first primary association from the first station and a secondary association or a second primary association from the second station, transmitting second instructions to the first station to provide first directional information and the second station to provide second directional information, when the first directional information corresponds to a first value within a threshold range of a second value corresponding to the second directional information, grouping, by executing an instruction with a processor, the first station and the second station, and transmitting information corresponding to the group to a server to schedule communications between a first and second access point and the first station and the second station.

Example 20 includes the method of example 19, wherein the signal measurement protocol corresponds to a received signal strength indicator measurement.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A first access point to perform a grouping protocol, the first access point comprising:
an interface to:
transmit first instructions to a first station to perform a first signal measurement protocol to determine if the first station is primarily associated with the first access point or secondarily associated with the first access point, the primary association occurring when a first signal strength between the first station and the first access point is higher than a second signal strength between the first station and a second access point, the secondary association occurring when the first signal strength is lower than the second signal strength and the second signal strength is above a threshold;
transmit second instructions to a second station to perform a second signal measurement protocol to determine if the second station is primarily associated with the first access point or secondarily associated with the first access point;
responsive to obtaining the primary association from the first station and the secondary association or the primary association from the second station, transmit third instructions to the first station to provide first directional information and the second station to provide second directional information;
a processor to, when the first directional information corresponds to a first value within a threshold range of a second value corresponding to the second directional information, group the first station and the second station into a group; and
the interface to transmit information corresponding to the group to a server to schedule communications between the first access point and the second access point and the first station and the second station.

2. The first access point of claim 1, wherein the first signal measurement protocol corresponds to a received signal strength indicator measurement.

3. The first access point of claim 1, wherein the group corresponds to the first station and the second station being within a threshold distance of each other.

4. The first access point of claim 1, wherein the communications include first communications and second communications, the server to schedule the first communications for the first station and the second communications for the second station based on at least one of a different time or a different frequency.

5. The first access point of claim 1, wherein the interface is to:
transmit the first instructions to a third station to perform first the signal measurement protocol; and
when the at least one of a third primary association or a second secondary association is not received from the third station, refrain from sending the second instructions to the third station.

6. The first access point of claim 1, wherein the first station is connected to the first access point and the second station is connected to the second access point.

7. The first access point of claim 1, wherein the communications are first communications, and:
the interface is to receive a schedule from the server; and
the processor is to facilitate second communications with the first station according the schedule.

8. The first access point of claim 1, wherein the interface is to transmit at least one of the first instructions, the second instructions, or the information by instructing radio architecture.

9. A tangible computer readable storage medium comprising instructions which, when executed, cause a first access point to at least:
transmit first instructions to a first station to perform a signal measurement protocol to determine if the first station is primarily associated with the first access point or secondarily associated with the first access point, the primary association occurring when a first signal strength between the first station and the first access point is higher than a second signal strength between the first station and a second access point, the secondary association occurring when the first signal strength is lower than the second signal strength and the second signal strength is above a threshold;
transmit second instructions to a second station to perform a second signal measurement protocol to determine if the second station is primarily associated with the first access point or secondarily associated with the first access point;
responsive to obtaining the primary association from the first station and the secondary association or the primary association from the second station, transmit third instructions to the first station to provide first directional information and the second station to provide second directional information;
when the first directional information corresponds to a first value within a threshold range of a second value corresponding to the second directional information, group the first station and the second station into a group; and
transmit information corresponding to the group to a server to schedule communications between the first access point and the second access point and the first station and the second station.

10. The computer readable storage of claim 9, wherein the signal measurement protocol corresponds to a received signal strength indicator measurement.

11. The computer readable storage of claim 9, wherein the group corresponds to the first station and the second station being within a threshold distance of each other.

12. The computer readable storage of claim 9, wherein the communications include first communications and second communications, the instructions to cause the first access point to schedule the first communications for the first station and the second communications for the second station based on at least one of a different time or a different frequency.

13. The computer readable storage of claim 9, wherein the instructions cause the first access point to:
transmit the first instructions to a third station to perform the signal measurement protocol; and when the at least one of a third primary association or a second secondary association is not received from the third station, refrain from sending the second instructions to the third station.

14. The computer readable storage of claim 9, wherein the first station is connected to the first access point and the second station is connected to the second access point.

15. The computer readable storage of claim 9, wherein the communications are first communications, the instructions to cause the first access point to:
receive a schedule from the server; and
facilitate second communications with the first station according the schedule.

16. The computer readable storage of claim 9, wherein the instructions cause the first access point to transmit at least one of the first instructions, the second instructions, or the information by instructing radio architecture.

17. A method to perform a grouping protocol, the method including:
transmitting first instructions to a first station to perform a signal measurement protocol to determine if the first station is primarily associated with a first access point or secondarily associated with the first access point, the primary association occurring when a first signal strength between the first station and the first access point is higher than a second signal strength between the first station and a second access point, the secondary association occurring when the first signal strength is lower than the second signal strength and the second signal strength is above a threshold;
transmitting second instructions to a second station to perform a second signal measurement protocol to determine if the second station is primarily associated with the first access point or secondarily associated with the first access point;
responsive to obtaining the primary association from the first station and the secondary association or the primary association from the second station, transmitting third instructions to the first station to provide first directional information and the second station to provide second directional information;
when the first directional information corresponds to a first value within a threshold range of a second value corresponding to the second directional information, generating. by executing an instruction with a processor, a group the first station and the second station; and
transmitting information corresponding to the group to a server to schedule communications between the first access point and the second access point and the first station and the second station.

18. The method of claim 17, wherein the signal measurement protocol corresponds to a received signal strength indicator measurement.

19. The method of claim 17, wherein the group corresponds to the first station and the second station being within a threshold distance of each other.

20. The method of claim 17, wherein the communications include first communications and second communications, the server to schedule the first communications for the first station and the second communications for the second station based on at least one of a different time or a different frequency.

* * * * *